(No Model.)
G. W. UPTON.
FISHING FLY.
No. 468,376. Patented Feb. 9, 1892.
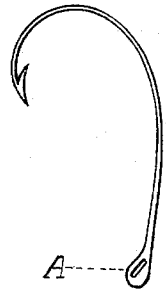  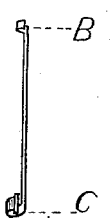 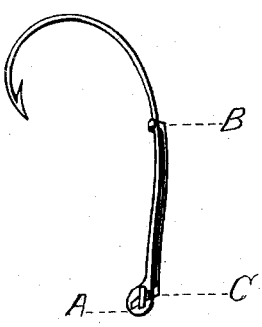
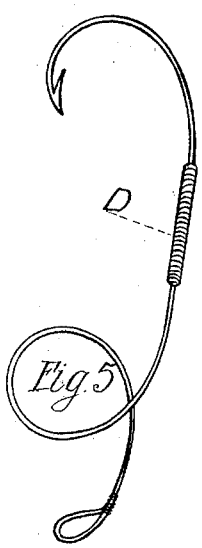 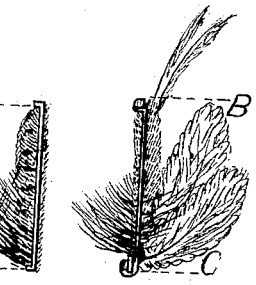 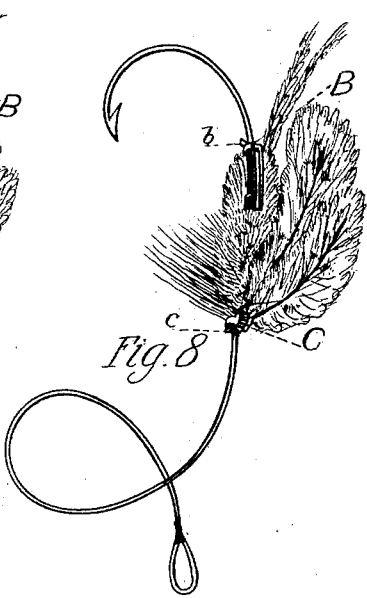
Witnesses
E. B. Taylor
E. W. Dow
Inventor
George W. Upton

UNITED STATES PATENT OFFICE.

GEORGE W. UPTON, OF WARREN, OHIO.

FISHING-FLY.

SPECIFICATION forming part of Letters Patent No. 468,376, dated February 9, 1892.

Application filed August 20, 1891. Serial No. 403,259. (No model.)

*To all whom it may concern:*

Be it known that I, GEORGE W. UPTON, a citizen of the United States, residing at Warren, in the county of Trumbull and State of Ohio, have invented a new and useful Improvement in Artificial Flies for Angling, of which the following is a specification.

My invention relates to improvements in artificial flies for angling, in which the feathers, silks, gimps, and other materials are attached to one or more separate pieces of metal or fiber, which may be attached to or detached from the fish-hook instead of attaching the feathers, silks, gimps, &c., to the fish-hook itself; and the objects of my improvements are, first, to enable the angler to more quickly change the artificial flies; second, to enable the angler to save the artificial fly when the gimp, gut, or other attaching material is broken or weakened, instead of throwing it away with the hook, as has been done heretofore. I attain these objects by the mechanism illustrated in the accompanying drawings, in which—

Figure 1 is a fish-hook flattened on the sides or end, or both, of the shank. Fig. 2 is a piece of metal or fiber which may be covered with feathers, silks, or other materials and be attached under the shank of the fish-hook. Fig. 3 is a piece of metal or fiber which may be covered with feathers, silk, or other materials and be attached on the shank of a fish-hook. Fig. 4 is a fish-hook with strip represented in Fig. 3 attached. Fig. 5 is a fish-hook with flattened shank tied on a snell or gut. Fig. 6 is a strip, shown in Fig. 2, with feathers, &c., attached. Fig. 7 is a strip, shown in Fig. 3, with feathers, &c., attached. Fig. 8 is the strips shown in Figs. 6 and 7 with feathers, &c., tied thereon and all attached to a flattened snelled hook such as is shown in Fig. 5.

Similar letters refer to similar parts throughout the several views.

Fig. 1 shows the fish-hook flattened as to the sides of the shank, instead of round, and with the extreme end of the shank flattened and enlarged at A, with a squared shouldered hole cut in said enlargement A. The object of the flattening is to afford a grip for the clutch C, Fig. 3, either on the flat sides of the hook-shank or by locking through the hole shown at A, Fig. 1.

Fig. 2 shows a strip of metal or fiber or other suitable material with shouldered or bent ends at *b* and *c*, to which feathers, silks, or other materials may be attached, and said strip may be placed on the under side of said hook and locked there by the clutches B and C, Fig. 3, or by other convenient means, if it be desired to enlarge the artificial fly or vary its color or more effectually hide the shank of the hook should it be in sight after attachment of the strip shown in Figs. 3 and 7.

Fig. 3 shows a strip of metal or fiber or other suitable material, of a spring nature or otherwise, with a clutch to spring or grasp at the end B the shank of the hook and with or without a shouldered projection, all as shown at C, designed to clutch or clasp the flattened shank of the hook or the round shank of the fish-hooks now known to the markets, or to lock through the squared shouldered hole shown at A, Fig. 1, as shown in Fig. 4, all as convenience dictates, after the feathers, silks, &c., have been attached to said strip, as shown in Fig. 7. The clutch C having been attached, the bending of the strip, Fig. 3, over the back of the hook, causing the clutch B to engage the shank, will aid in holding the fly closely to the hook, and the device is so intended.

Fig. 4 shows the strip shown in Fig. 3 attached to the hook shown in Fig. 1.

Fig. 5 is a fish-hook with flattened shank with snell attached.

Fig. 6 is the strip shown in Fig. 2 with feathers, &c., attached.

Fig. 7 is the strip shown in Fig. 3 with feathers attached ready to be attached to the hook, Fig. 1 or 5, to make complete fly, as shown in Fig. 8, ready for angling.

I am aware that prior to my invention combinations of feathers and other materials have been attached to hooks to imitate flies and other insects for anglers' uses and that fish-hooks have been made with rings and holes in the ends of their shanks. I do not therefore claim either of those points.

I do not limit myself to the particular form of clutching device shown at B and C and described, nor to the particular shaped flattening of the shank of the fish-hook, nor the end thereof shown at A, Fig. 1, as they may obviously be varied.

What I do claim as my invention, and desire to secure by Letters Patent, is—

1. A fish-hook having an artificial fly, consisting of a strip detachably engaging the shank of the hook and carrying feathers.

2. The combination, with a fish-hook, of a strip having its ends detachably clasping the shank of the hook and feathers secured to said strip.

3. The combination, with a fish-hook having a flattened shank and provided with a slot in the end of the shank, of a strip carrying feathers and having one end provided with a hook engaging said slot and its other end detachably clasping the shank of the hook.

GEORGE W. UPTON.

Witnesses:
EZRA B. TAYLOR,
EARLE W. DOW.